United States Patent [19]
Silkowski et al.

[11] Patent Number: 5,893,598
[45] Date of Patent: Apr. 13, 1999

[54] ACCESSING APPARATUS FOR A PICKUP TRUCK HAVING A COVERED CARGO SPACE

[76] Inventors: Thomas A. Silkowski, 865 De Etta, Troy, Mich. 48098; Larry R. Zezula, 1455 Bell's Ferry Rd., Suite E, Marietta, Ga. 30066

[21] Appl. No.: 08/890,879

[22] Filed: Jul. 10, 1997

[51] Int. Cl.⁶ ............................................. B60R 9/00
[52] U.S. Cl. ..................... 296/37.6; 296/3; 224/403
[58] Field of Search ..................... 296/37.6, 3; 224/403

[56] References Cited

U.S. PATENT DOCUMENTS

| | | | |
|---|---|---|---|
| 4,065,041 | 12/1977 | Stegavig et al. | 296/3 |
| 4,138,046 | 2/1979 | De Freze | 296/3 |
| 4,488,669 | 12/1984 | Waters | 224/273 |
| 4,681,360 | 7/1987 | Peters et al. | 296/37.6 |
| 4,752,095 | 6/1988 | Brady | 296/37.6 |
| 4,770,458 | 9/1988 | Burke et al. | 296/3 |
| 4,889,377 | 12/1989 | Hughes | 296/3 |
| 4,966,401 | 10/1990 | Dutro et al. | 296/37.6 |
| 5,121,959 | 6/1992 | King | 296/37.6 |
| 5,249,910 | 10/1993 | Ball | 414/538 |
| 5,427,487 | 6/1995 | Brosfske | 410/121 |

*Primary Examiner*—Gary C. Hoge
*Attorney, Agent, or Firm*—Norman B. Rainer

[57] ABSTRACT

An accessing apparatus removably installable into the cargo space of a rearwardly unloadable service vehicle includes front and rear frame assemblies of generally planar configuration disposed in parallel spaced apart vertical planes. Guide tracks extend between the upper and lower extremities of the frame assemblies for accommodating the wheels of storage components such as a container, side racks and an overhead rack. By virtue of their wheeled engagement of the tracks, the storage components can be easily moved in a lateral direction in and out of the rear of the cargo space.

12 Claims, 3 Drawing Sheets

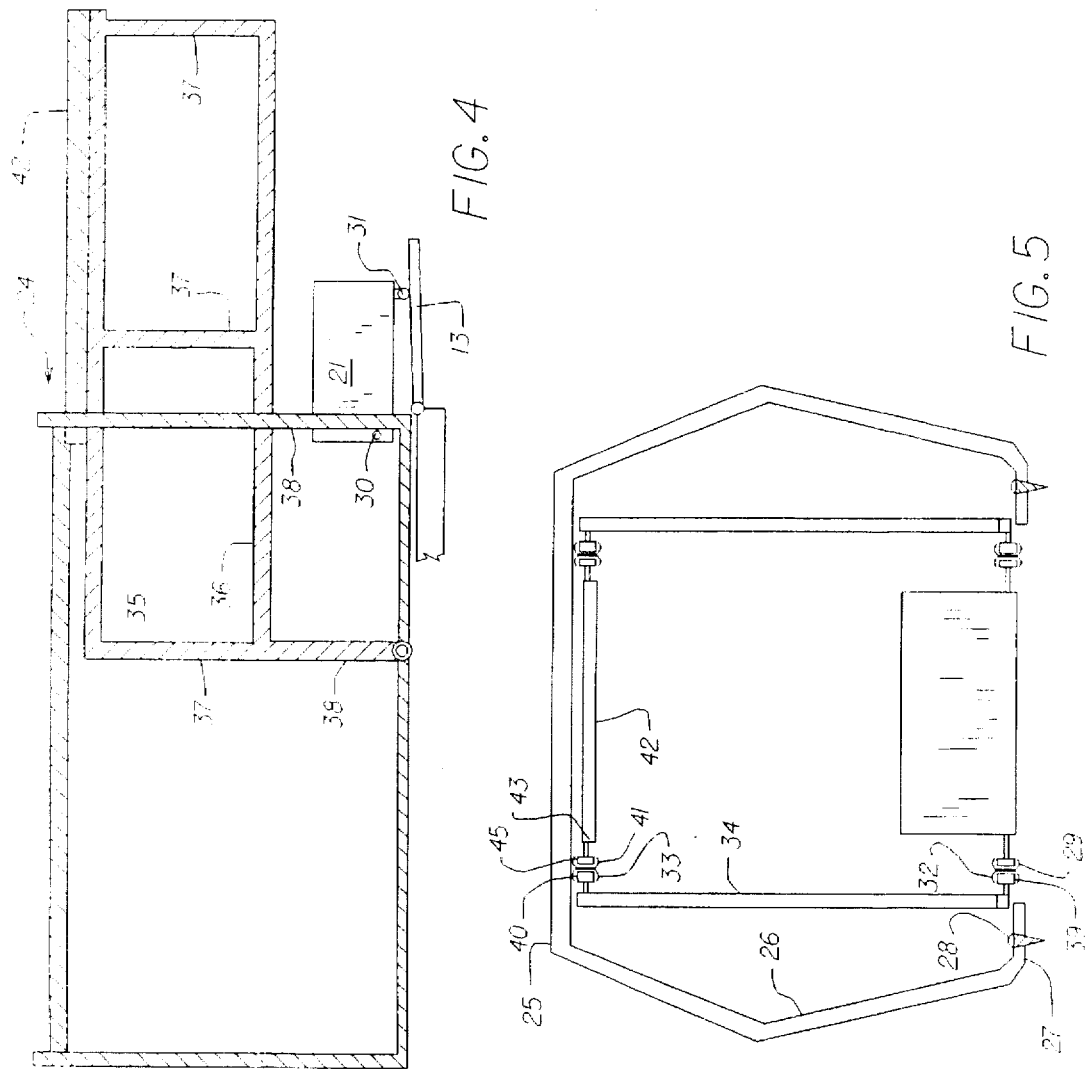

ACCESSING APPARATUS FOR A PICKUP TRUCK HAVING A COVERED CARGO SPACE

BACKGROUND OF THE INVENTION

1. Field of the Invention

This invention concerns apparatus for manipulating items carried in the cargo area of automotive vehicles such as pickup trucks.

2. Description of the Prior Art

Many cargo vehicles such as pickups, vans, and the like are equipped with permanent or removable covers over the cargo area for protecting the cargo or for other utilitarian purposes. Since this type of covered vehicle only has a rear opening, it is difficult to reach articles located at the front of the cargo area. It is usually necessary to climb into the rear opening and work the articles rearward or to risk injury by leaning inward and picking up or pulling the articles rearward. The same applies in reverse, namely, when loading the vehicle.

Various devices have been disclosed for efficiently storing items in the cargo space of a pickup truck, and moving said items toward the rear of the truck for accessibility. Most typically, tool boxes are stored in the forward-most part of the cargo area, and are not easily accessible unless moved rearwardly toward the tailgate of the truck. Devices which facilitate controlled rearward displacement of storage containers within a truck cargo space are disclosed in U.S. Pat. Nos. 4,681,360; 4,752,095, and 5,121,959.

In the case of pickup trucks having a rigid cover disposed above the cargo area, the interior sidewalls and roof of the cover are capable of supportively storing items. However, as in the case of forwardly located storage boxes, it is difficult to access items stored within the covered region of the cargo space adjacent the walls and roof of the cover. Any apparatus for enhancing the storage and access of items within the covered cargo space of a pickup truck has to be an aftermarket item installable after the truck has been manufactured because it is a feature that is not of universal interest to all owners of pickup trucks.

It is accordingly an object of the present invention to provide apparatus for enhancing the accessibility of items stored within a covered cargo space of a rearwardly unloadable service vehicle such as a pickup truck or van.

It is another object of this invention to provide apparatus as in the foregoing object for forwardly and rearwardly displacing a storage compartment supported by the floor of the cargo space of a service vehicle.

It is a further object of the present invention to provide apparatus of the aforesaid nature for forwardly and rearwardly displacing items stored adjacent the walls and roof of a covered cargo space of a service vehicle.

It is yet another object of this invention to provide apparatus of the aforesaid nature which can be adjustably installed into the cargo space of a service vehicle.

It is a still further object of the present invention to provide accessing apparatus of the aforesaid nature of durable, simple construction amenable to low cost manufacture.

These objects and other objects and advantages of the invention will be apparent from the following description.

SUMMARY OF THE INVENTION

The above and other beneficial objects and advantages are accomplished in accordance with the present invention by an accessing apparatus removably installable into the cargo space of a rearwardly unloadable service vehicle, said cargo space having an axis of elongation, a floor and a storage container supported by said floor, and enclosed by a rigid cover having opposed sidewalls and a roof, said apparatus comprising:

a) front and rear frame assemblies of generally planar configuration disposed in parallel spaced apart vertical planes orthogonal to said axis of elongation, each frame assembly being comprised of a roof portion, opposed side portions, and opposed footing portions, b) parallel paired lower inwardly facing elongated guide means extending between the footing portions of said frame assemblies, c) parallel paired lower outwardly directed elongated guide means extending between the footing portions of said frame assemblies, d) parallel paired upper outwardly directed elongated guide means extending between the roof portions of said frame assemblies, and e) parallel paired upper inwardly facing elongated guide means extending between the roof portions of said frame assemblies.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 4 is a side view similar to FIG. 3 but showing said toolbox, side utility racks and overhead rack in their forward most displacement.

FIG. 5 is an enlarged fragmentary rear view of the embodiment of FIG. 3.

Expressions such as "inwardly," "outwardly," "front," "rear," "upper," and "lower," and terms of similar import have reference to the center of said cargo space.

DESCRIPTION OF THE PREFERRED EMBODIMENT

Figure 1:
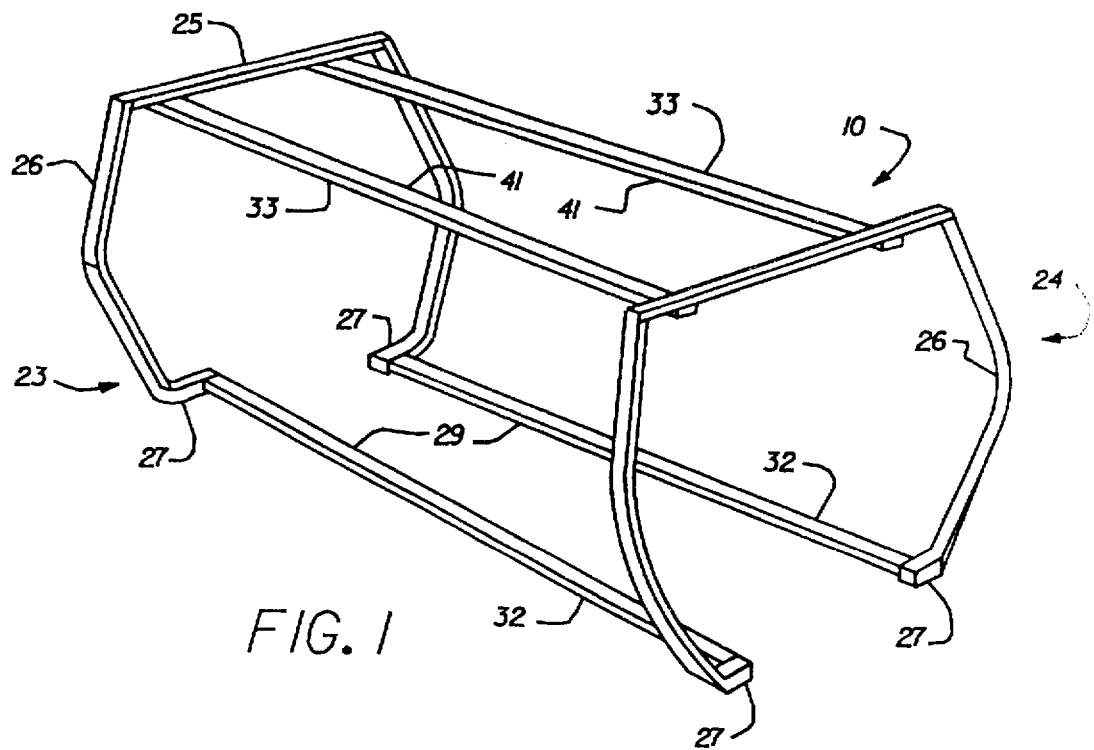
FIG. 1 is a perspective rear and side view of an embodiment of the accessing apparatus of the present invention.
Figure 3:
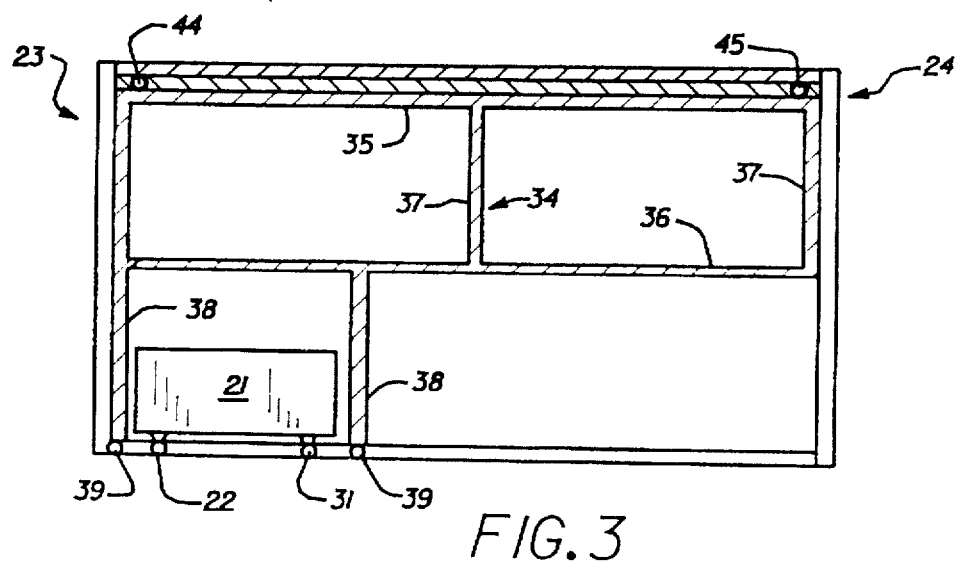
FIG. 3 is a side view of the embodiment of FIG. 1 additionally including a toolbox, side utility racks and an overhead utility rack.
Figure 2:
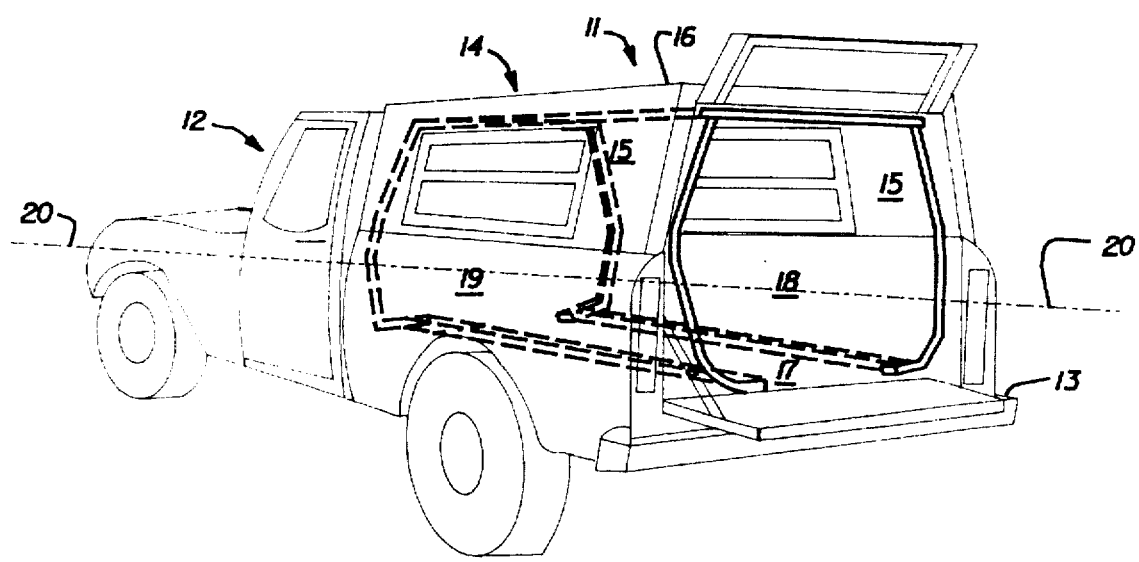
FIG. 2 is a rear perspective view of the embodiment of FIG. 1 shown in operative association with the covered cargo space of a conventional pickup truck.

Referring now to FIGS. 1-5, an embodiment of the accessing apparatus 10 of the present invention is shown in operative association with the cargo space 11 of a pickup truck 12 having a rear tailgate 13. Said cargo space is enclosed by a rigid cover or cap unit 14 having opposed sidewalls 15 and a roof 16 which spans said sidewalls. Cargo space 11 is bounded in part by floor 17, side panels 18, front panel 19, and tailgate 13, and is generally elongated along the center vehicle axis 20. A storage container 21, adapted to roll upon floor 17 by virtue of front and rear pairs of wheels 22 and 31, respectively, attached to the underside of said container, is generally stored in abutment with front panel 19.

Said accessing apparatus 10 is comprised of substantially identical front and rear frame assemblies 23 and 24, respectively, of generally planar configuration and disposed in parallel spaced apart vertical planes orthogonal to axis 20. Each frame may be assembled from tubular metal components, and comprises a roof portion 25, opposed side portions 26, and opposed footing portions 27. Said footing portions are preferably provided with mounting means such as holes 28 which permit bolted securement to the floor 17 of the cargo space. Side portions 26 are outwardly bowed to conform with the side contour of the cargo space.

Paired parallel lower inwardly facing elongated guide means in the form of tracks 29 extend between the footing portions of the two frame assemblies. Tracks 29 engage the wheels of storage container 21, thereby guiding the rolling movement of said container between front panel 19 and tailgate 13. Limiting means in the form of outwardly directed abutment bars 30 extend horizontally from each side of said storage container. The abutment bars are positioned and configured so as to impinge upon rear frame assembly 24 in a manner to prevent the front pair of wheels 22 from leaving tracks 29, while enabling the rear pair of wheels 31 to rest upon tailgate 13.

Paired parallel lower outwardly directed elongated guide means in the form of tracks 32 extend between the footing portions of the two frame assemblies.

Paired parallel upper outwardly directed elongated guide means in the form of tracks 33 extend between the roof portions of the two frame assemblies. Said upper outwardly directed tracks 33 are parallel to and vertically coplanar with the corresponding lower outwardly directed tracks 32. Accordingly, the pair of tracks 33 and pair of tracks 32 are disposed in a rectangular array, as seen in a rear view such as FIG. 5.

Said upper and lower outwardly directed guide tracks, 33 and 32, respectively, function in concert to guide the rolling movement of optionally employed opposed side utility racks 34. Each rack 34 is shown comprised of upper and lower beams 35 and 36, respectively, interconnected by vertical struts 37, and provided with paired support legs 38. Wheels 39, held by the lower extremities of support legs 38, interact with lower outwardly directed tracks 32. Wheels 40, held by upper beam 35, interact with upper outwardly directed tracks 33. By virtue of such manner of interaction, each rack 34 can be independently moved forwardly or rearwardly in the direction of axis 20. Suitable limiting means are associated with racks 34 to stop rearward displacement at the point where the wheel 39 of the rearwardmost support leg 38 is still confined by lower tracks 32 adjacent rear frame assembly 24.

The side utility racks 34 may be utilized to pendently support various tools and/or supplies.

Paired parallel upper inwardly facing elongated guide means in the form of tracks 41 extend between the roof portions of the two frame assemblies.

An optionally employed overhead utility rack 42 is horizontally disposed at an elevation closely below the roof portions of said frame assemblies. The lateral extremities 43 of said overhead utility rack are provided with front and rear pairs of wheels 44 and 45, respectively, said wheels engaging upper inwardly facing tracks 41. Such manner of construction enables rack 42 to be moved forwardly and rearwardly along axis 20. The maximum extent of rear movement is controlled by limiting means which cause the front pair of wheels 44 to remain in tracks 41 adjacent rear frame assembly 24.

The overhead utility rack, which may be a panel, gridwork or framework, is intended to hold elongated objects such as panels, pipes, wooden beams and long handled tools.

In the illustrated embodiment, the various track members are shown having a generally C-shaped contour, and attached in back to back relationship. In alternative embodiments, however, other elongated guide means may be utilized. For example, the upper beam 35 of the side utility racks 34 may be provided with a slide bushing instead of wheels, and the bushings may be adapted to slide upon elongated guide means in the form of a polished bar.

By virtue of the aforesaid components and their interaction, any or all of the four storage components, namely container 21, side racks 34 and overhead rack 42 can be pulled rearwardly out of the cargo space. The nature of the aforesaid components also facilitates easy and adaptable installation into the cargo space of a pickup truck. Such installation would include the insertion of bolts through holes 28 in said footing portions to engage the floor 17 of the cargo space. Other fastening means such as C-clamps may be employed interactively with the side portions 26 of the frame assembly and side panels 18 of the truck or sidewalls 15 of cover 14.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described our invention, what is claimed is:

1. An accessing apparatus removably installable into the cargo space of a rearwardly unloadable service vehicle, said cargo space having an axis of elongation, a floor and a wheeled storage container supported by said floor, and enclosed by a rigid cover having opposed sidewalls and a roof, said apparatus comprising:

a) front and rear frame assemblies of generally planar configuration disposed in parallel spaced apart vertical planes, each frame assembly comprised of a roof portion, opposed side portions, and opposed footing portions, b) parallel paired lower inwardly facing elongated guide means extending between the footing portions of said frame assemblies, c) parallel paired lower outwardly directed elongated guide means extending between the footing portions of said frame assemblies, d) parallel paired upper outwardly directed elongated guide means extending between the roof portions of said frame assemblies, and e) parallel paired upper inwardly facing elongated guide means extending between the roof portions of said frame assemblies.

2. The apparatus of claim 1 wherein each frame assembly is constructed of interengaged tubular metal components.

3. The apparatus of claim 1 wherein said footing portions are provided with mounting means which permit securement to said floor.

4. The apparatus of claim 1 wherein said side portions are bowed outwardly away from each other.

5. The apparatus of claim 1 wherein said guide means are tracks.

6. The apparatus of claim 1 wherein said paired lower inwardly facing guide means engage the wheels of said storage container.

7. The apparatus of claim 1 wherein said upper and lower inwardly and outwardly directed and inwardly facing guide means are disposed in a rectangular array.

8. The apparatus of claim 1 further comprising opposed side utility racks.

9. The apparatus of claim 8 wherein said utility racks are equipped with wheels which engage said upper and lower outwardly directed guide means, thereby permitting axial movement of said utility racks.

10. The apparatus of claim 1 further comprising an overhead utility rack.

11. The apparatus of claim 10 wherein said overhead utility rack is equipped with wheels which engage said upper inwardly facing guide means, thereby permitting axial movement of said overhead utility rack.

12. The apparatus of claim 5 wherein said tracks have a generally C-shaped contour.

* * * * *